United States Patent
Shizu et al.

(10) Patent No.: US 12,092,356 B2
(45) Date of Patent: Sep. 17, 2024

(54) AIR-CONDITIONING APPARATUS

(71) Applicant: Mitsubishi Electric Corporation, Tokyo (JP)

(72) Inventors: Keiichiro Shizu, Tokyo (JP); Kazunori Hatakeyama, Tokyo (JP); Atsushi Kawashima, Tokyo (JP); Yuta Tokuda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 303 days.

(21) Appl. No.: 17/634,413

(22) PCT Filed: Nov. 6, 2019

(86) PCT No.: PCT/JP2019/043545
§ 371 (c)(1),
(2) Date: Feb. 10, 2022

(87) PCT Pub. No.: WO2021/090414
PCT Pub. Date: May 14, 2021

(65) Prior Publication Data
US 2022/0316748 A1    Oct. 6, 2022

(51) Int. Cl.
*F24F 11/86*  (2018.01)
*F25B 49/02*  (2006.01)
(Continued)

(52) U.S. Cl.
CPC ............ *F24F 11/86* (2018.01); *F25B 49/022* (2013.01); *H02K 1/12* (2013.01); *H02P 27/06* (2013.01); *F24F 2110/10* (2018.01); *F24F 2110/20* (2018.01); *F25B 2600/021* (2013.01)

(58) Field of Classification Search
CPC .... F24F 11/86; F24F 2110/20; F24F 2110/10; F25B 49/022; F25B 2600/021
See application file for complete search history.

(56) References Cited

U.S. PATENT DOCUMENTS

2016/0341603 A1    11/2016    Kusukame et al.
2019/0195521 A1    6/2019    Kusukame et al.
(Continued)

FOREIGN PATENT DOCUMENTS

CN    110073591 A    7/2019
EP    3062031 A1    8/2016
(Continued)

OTHER PUBLICATIONS

Office Action mailed Oct. 4, 2022 for Japanese Patent Application No. 2021-554480 (and English machine translation).
(Continued)

*Primary Examiner* — Nael N Babaa
(74) *Attorney, Agent, or Firm* — Posz Law Group, PLC

(57) ABSTRACT

An air-conditioning apparatus includes an indoor unit and an outdoor unit including a compressor that compresses a refrigerant and a motor drive system that drives the compressor. The motor drive system includes an inverter that converts a DC voltage into an AC voltage, and an electric motor including three stator windings with both ends open. The electric motor operates based on the AC voltage obtained by the inverter. The motor drive system further includes a connection state switching unit that has a function to change the connection state of the three stator windings included in the electric motor, and sets the connection state to a star connection at the start of operation of the air-conditioning apparatus.

4 Claims, 12 Drawing Sheets

(51) Int. Cl.
*H02K 1/12* (2006.01)
*H02P 27/06* (2006.01)
*F24F 110/10* (2018.01)
*F24F 110/20* (2018.01)

(56) References Cited

U.S. PATENT DOCUMENTS

2019/0245471 A1 8/2019 Nigo et al.
2020/0021223 A1 1/2020 Arisawa et al.
2020/0186073 A1 6/2020 Nigo et al.
2020/0224904 A1 7/2020 Kusukame et al.

FOREIGN PATENT DOCUMENTS

| JP | 2007-218499 A | 8/2007 |
| JP | 2009-216324 A | 9/2009 |
| JP | 2016-217886 A | 12/2016 |
| JP | 2019-047574 A | 3/2019 |
| JP | 2019184207 A | 10/2019 |
| WO | 2015/059792 A1 | 4/2015 |
| WO | 2018/078835 A1 | 5/2018 |
| WO | 2019/021374 A1 | 1/2019 |
| WO | 2019/021450 A1 | 1/2019 |

OTHER PUBLICATIONS

Office Action dated Sep. 20, 2023 issued in corresponding Chinese Patent Application No. 201980101591.2 (and English translation).
International Search Report of the International Searching Authority dated Jan. 28, 2020, issued in corresponding International Application No. PCT/JP2019/043545 (and English Machine Translation).
Office Action dated May 24, 2024 issued in corresponding Chinese Patent Application No. 201980101591.2 (and English Machine Translation).

FIG.5
(A)
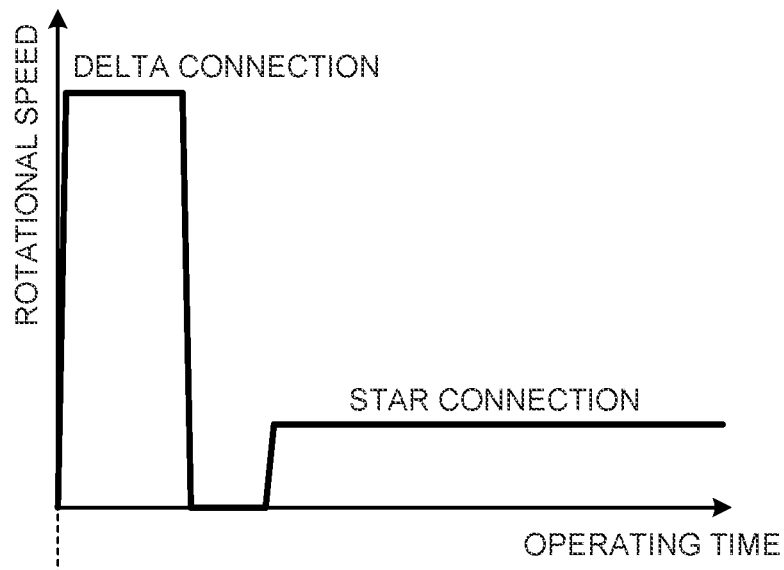
(B)
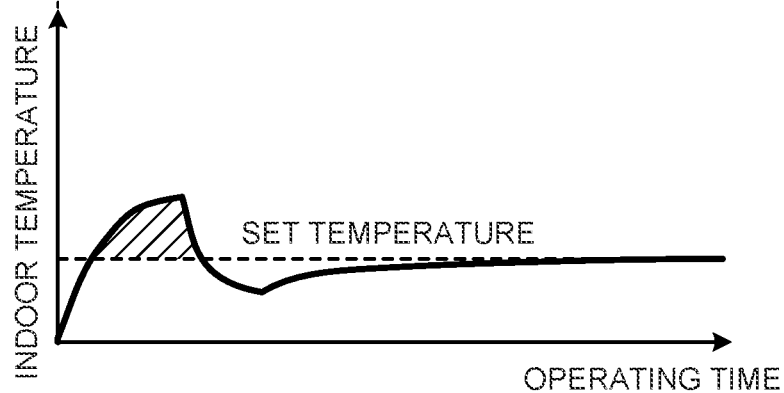

FIG.6
(A)
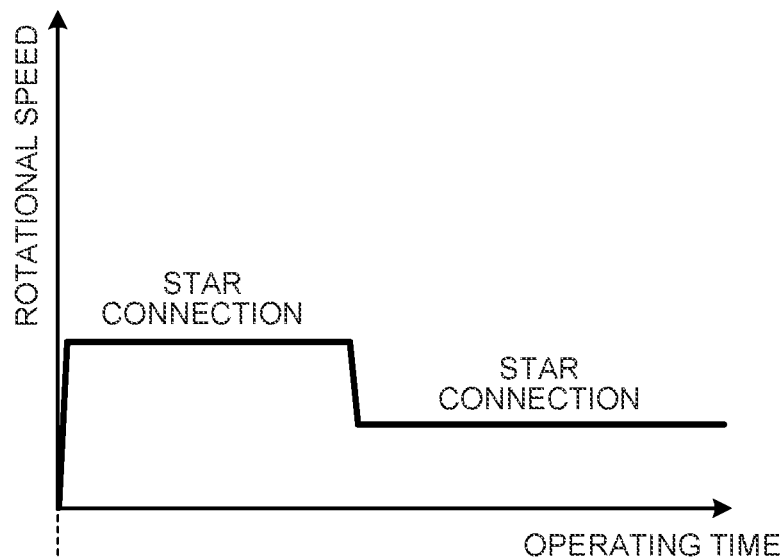
(B)
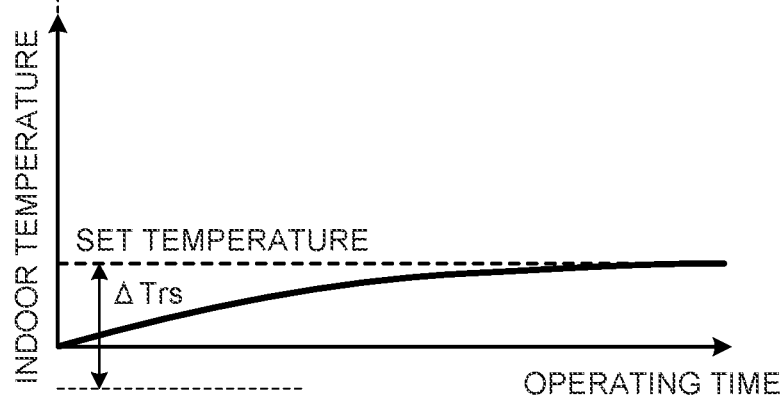

FIG.7
(A)
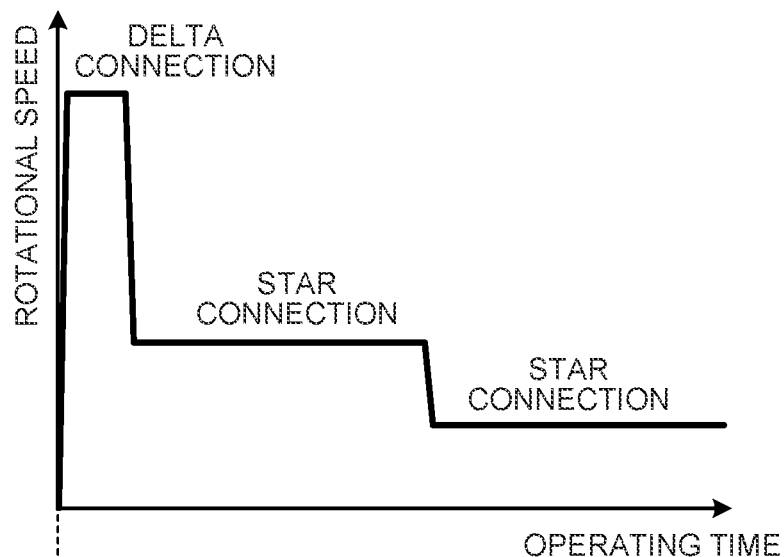
(B)
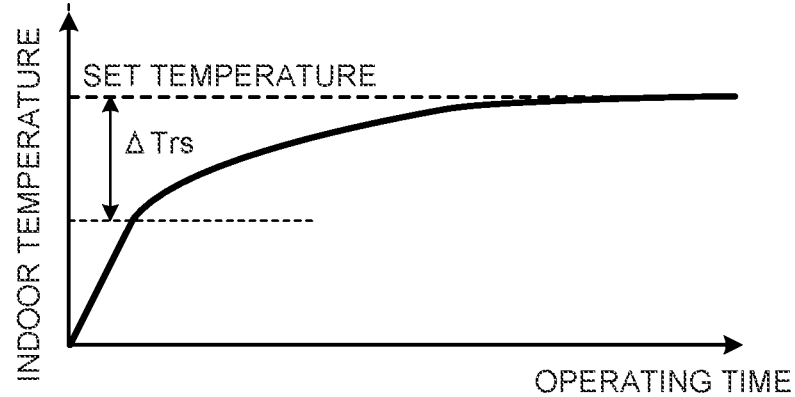

AIR-CONDITIONING APPARATUS

CROSS REFERENCE TO RELATED APPLICATION

This application is a U.S. National Stage Application of International Patent No. PCT/JP2019/043545 filed on Nov. 6, 2019, the disclosure of which is incorporated herein by reference.

TECHNICAL FIELD

The present invention relates to an air-conditioning apparatus that switches the connection state of stator windings of an electric motor.

BACKGROUND

There have been proposed motor drive systems that switch the connection state of stator windings included in an electric motor. A conventional motor drive system switches between a star connection and a delta connection with relays using coils. For example, it is desirable for a motor drive system for a compressor of an air-conditioning apparatus to drive an electric motor in a star connection under low load conditions with a relatively high degree of contribution to annual power consumption, and to drive the electric motor in a delta connection under high load conditions. This can improve driving efficiency under low load conditions, and also allows higher output under high load conditions.

In a technique disclosed in Patent Literature 1, when a remote controller transmits an operation start signal, an air-conditioning apparatus starts operation, and a motor drive system for a compressor is started in a delta connection. Then, a temperature difference between the indoor temperature detected by a temperature sensor of an indoor unit and a set temperature set with the remote controller is acquired. If the absolute value of the temperature difference is less than or equal to a threshold, switching from the delta connection to a star connection is performed.

PATENT LITERATURE

Patent Literature 1: WO 2019/021450 A

In the technique of Patent Literature 1, when the remote controller transmits the operation start signal, the motor drive system starts in the delta connection, bringing the air-conditioning apparatus into a high output state corresponding to high load conditions. If the absolute value of the temperature difference is less than or equal to the threshold at the time of transmission of the operation start signal, the time until the indoor temperature reaches the set temperature is relatively short when heat insulation performance between a space in which air conditioning with the air-conditioning apparatus is performed and a space adjacent to that space is relatively high, and the amount of heat exchange between the space in which air conditioning is performed and the adjacent space is relatively small. When the high output state continues even after the indoor temperature reaches the set temperature, an overshoot occurs in the indoor temperature, and the total output of the air-conditioning apparatus becomes excessive. Further, when the operation in the delta connection continues even after the indoor temperature reaches the set temperature, driving efficiency decreases.

SUMMARY

The present invention has been made in view of the above. It is an object of the present invention to provide an air-conditioning apparatus capable of preventing excessive total output while improving driving efficiency.

In order to solve the above-described problems and achieve the object, an air-conditioning apparatus according to the present invention includes an indoor unit and an outdoor unit including a compressor that compresses a refrigerant and a motor drive system that drives the compressor. The motor drive system includes an inverter that converts a DC voltage into an AC voltage, and an electric motor including three stator windings with both ends open. The electric motor operates based on the AC voltage obtained by the inverter. The motor drive system further includes a connection state switching unit that has a function to change a connection state of the three stator windings included in the electric motor, sets the connection state to a star connection at a start of operation of the air-conditioning apparatus, and selects the connection state at a startup of the electric motor, based in part or in whole on information related to an installation space of the indoor unit, a temperature and a humidity of the installation space, a temperature difference between the temperature of the installation space and a set temperature, information related to distribution of the temperature and the humidity of the installation space, an operating condition of the air-conditioning apparatus, information related to temporal changes in the temperature and the humidity, and information related to temporal changes in the distribution of the temperature and the humidity.

The air-conditioning apparatus according to the present invention has the effect of being able to prevent excessive total output while improving driving efficiency.

BRIEF DESCRIPTION OF DRAWINGS

FIG. 5 is a timing chart illustrating how the rotational speed and the connection state of an electric motor in a conventional air-conditioning apparatus and the indoor temperature change with time.

FIG. 6 is a timing chart illustrating how the rotational speed and the connection state of the electric motor in the air-conditioning apparatus according to the first embodiment and the indoor temperature change with time when the absolute value of a temperature difference at the start of operation is less than or equal to a threshold.

FIG. 7 is a timing chart illustrating how the rotational speed and the connection state of the electric motor in the air-conditioning apparatus according to the first embodiment and the indoor temperature change with time when the absolute value of the temperature difference at the start of operation is larger than the threshold.

DETAILED DESCRIPTION

Hereinafter, an air-conditioning apparatus according to embodiments of the present invention will be described in detail with reference to the drawings. Note that the embodiments are not intended to limit the invention.

First Embodiment

Figure 1:
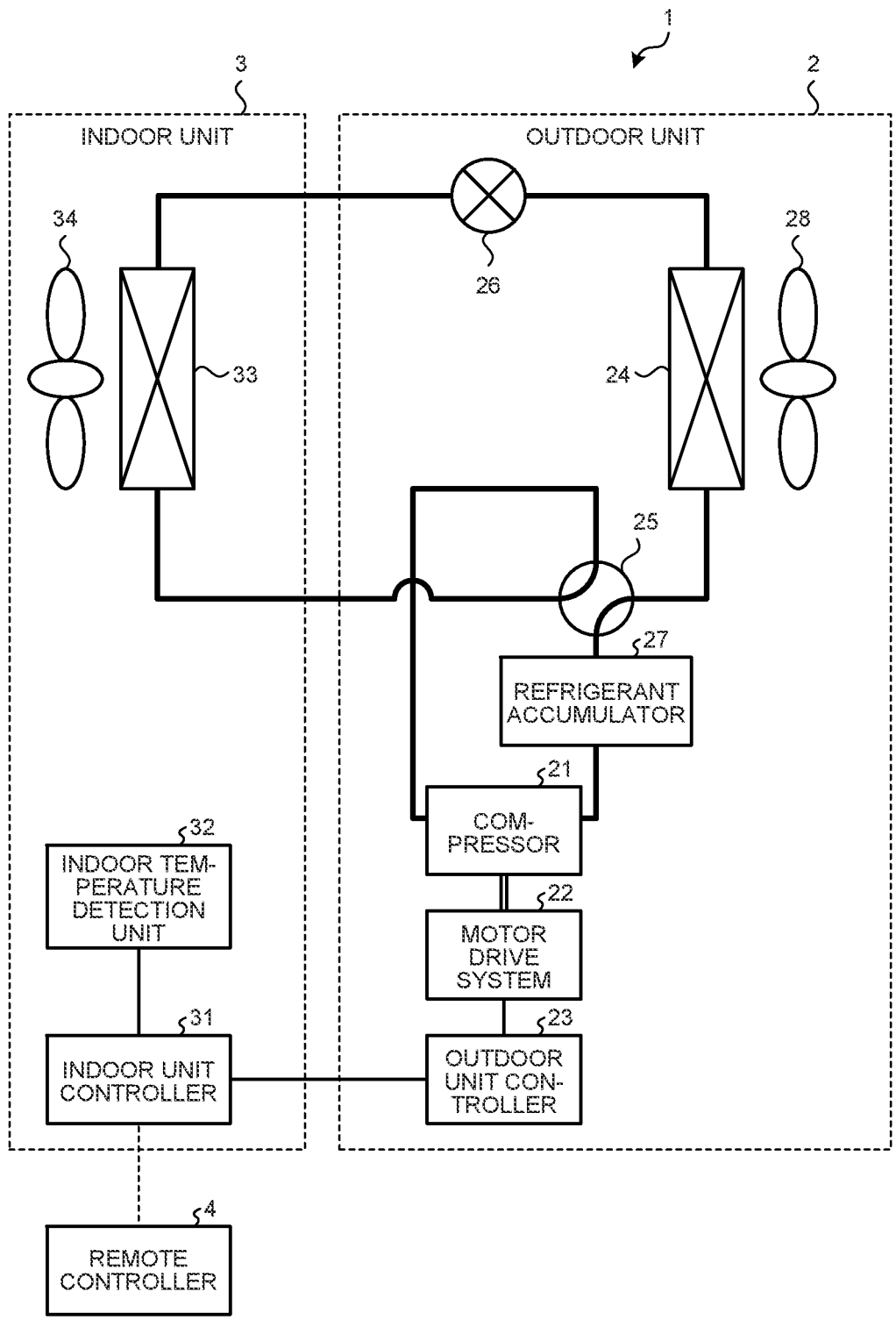
FIG. 1 is a diagram illustrating the configuration of an air-conditioning apparatus according to a first embodiment.

First, the configuration of an air-conditioning apparatus 1 according to a first embodiment will be described. FIG. 1 is a diagram illustrating the configuration of the air-conditioning apparatus 1 according to the first embodiment. The air-conditioning apparatus 1 includes an outdoor unit 2 and an indoor unit 3.

The outdoor unit 2 includes a compressor 21 that compresses a refrigerant, a motor drive system 22 that drives the compressor 21, an outdoor unit controller 23 that controls air conditioning, and an outdoor unit heat exchanger 24 that performs heat exchange between air that has moved from the outside of the outdoor unit 2 to the inside of the outdoor unit 2 and the refrigerant. The outdoor unit 2 further includes a four-way valve 25 that switches the flow path of the refrigerant, a pressure-reducing unit 26 that reduces the pressure of the refrigerant, a refrigerant accumulator 27 in which the refrigerant is retained, and an outdoor unit fan 28 that moves air outside the outdoor unit 2 to the inside of the outdoor unit 2.

The indoor unit 3 includes an indoor unit controller 31 that controls air conditioning, an indoor temperature detection unit 32 that detects the temperature of a room in which the indoor unit 3 is installed, an indoor unit heat exchanger 33 that performs heat exchange between air that has moved from the outside of the indoor unit 3 to the inside of the indoor unit 3 and the refrigerant, and an indoor unit fan 34 that moves air outside the indoor unit 3 to the inside of the indoor unit 3.

The indoor unit controller 31 determines the amount of heat exchange required in the air-conditioning apparatus 1, based on an operation by a user (not illustrated) using a remote controller 4 and the indoor temperature detected by the indoor temperature detection unit 32, and determines the rotational speed of a motor included in the compressor 21, the operation of the four-way valve 25, the rotational speed of the outdoor unit fan 28, and the rotational speed of the indoor unit fan 34. The indoor temperature is the temperature of the room in which the indoor unit 3 is installed. For example, the user's operation using the remote controller 4 is an operation to set a target temperature. Hereinafter, the target temperature is described as a "set temperature". FIG. 1 also illustrates the remote controller 4.

The indoor temperature detection unit 32 is disposed anywhere inside the indoor unit 3. When the indoor temperature detection unit 32 is disposed upstream of an air passage produced by the indoor unit fan 34, the temperature of air to be conditioned by the air-conditioning apparatus 1 can be detected accurately. For example, when the indoor temperature detection unit 32 and the indoor unit fan 34 sandwich the indoor unit heat exchanger 33, the indoor temperature detection unit 32 is disposed in a place opposite to a place where the indoor unit fan 34 is disposed with respect to the indoor unit heat exchanger 33.

Figure 2:
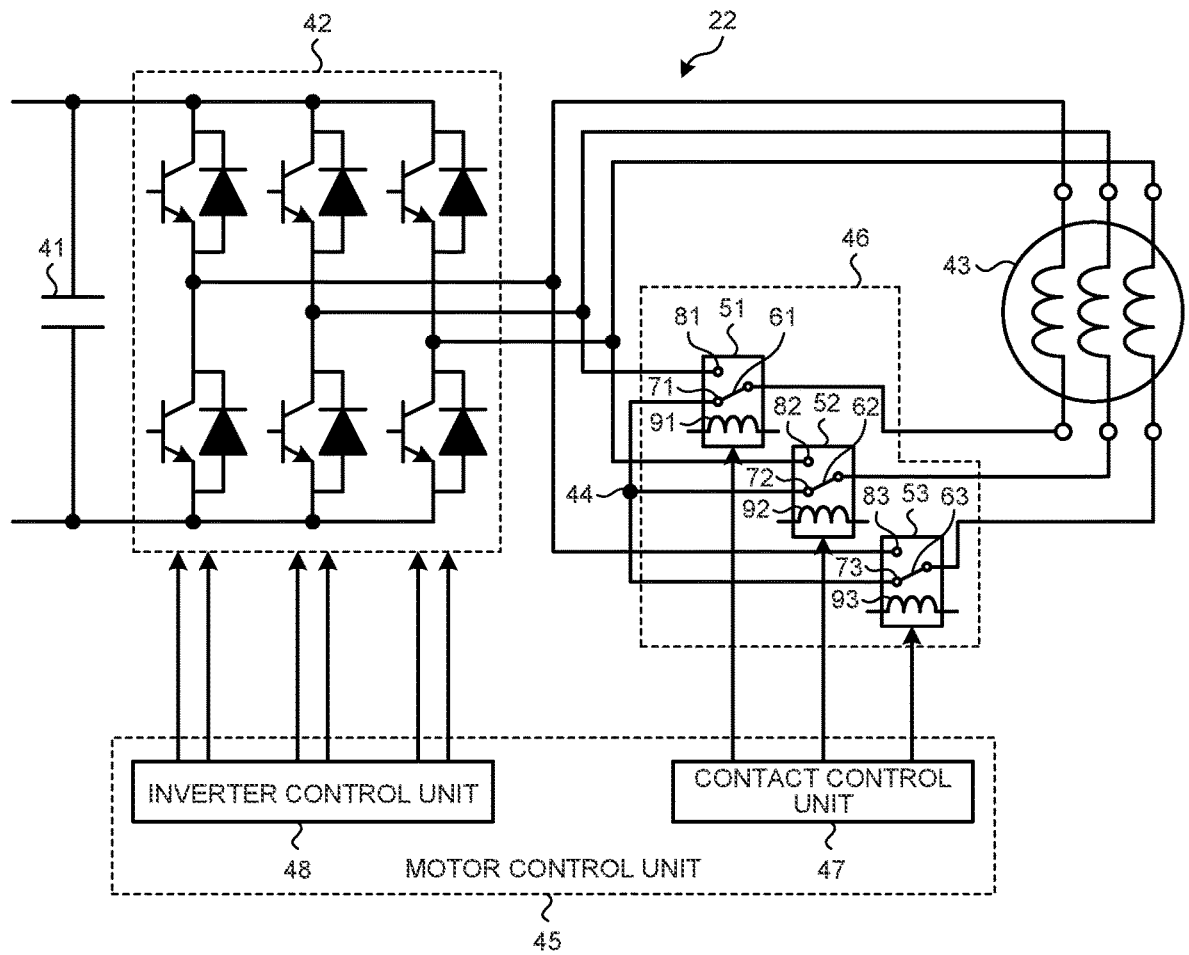
FIG. 2 is a diagram illustrating the configuration of a motor drive system included in an outdoor unit in the air-conditioning apparatus according to the first embodiment.

FIG. 2 is a diagram illustrating the configuration of the motor drive system 22 included in the outdoor unit 2 in the air-conditioning apparatus 1 according to the first embodiment. The motor drive system 22 includes a capacitor 41, an inverter 42 that converts a DC voltage into an AC voltage, an electric motor 43 including three stator windings with both ends open, a neutral terminal 44, a motor control unit 45 that controls the electric motor 43, and a connection state switching unit 46 having a function to change the connection state of the three stator windings included in the electric motor 43. The electric motor 43 operates based on the AC voltage obtained by the inverter 42.

The connection state switching unit 46 sets the connection state to a star connection at the start of operation of the air-conditioning apparatus 1. After the start of operation of the air-conditioning apparatus 1, the connection state switching unit 46 selects the connection state based on the result of comparison of a temperature difference between the temperature of the room in which the indoor unit 3 is installed and the set temperature with a predetermined threshold. The motor control unit 45 includes a contact control unit 47 that controls the connection state switching unit 46, and an inverter control unit 48 that controls the inverter 42. The motor control unit 45 is incorporated in the outdoor unit controller 23.

The capacitor 41 holds DC power supplied from a converter (not illustrated) as a DC voltage. The converter is a device that converts AC power supplied from an AC power supply (not illustrated) into DC power. The inverter 42 converts the DC voltage held by the capacitor 41 into an AC voltage by pulse width modulation, and applies the AC voltage to the electric motor 43 to be driven. The inverter control unit 48 controls semiconductor switching elements of the inverter 42. The inverter control unit 48 can perform the control based on a known control method.

The contact control unit 47 changes the connection state of the three stator windings of the electric motor 43 by operating contact plates 61, 62, and 63 included in relays 51, 52, and 53 described later.

The connection state switching unit 46 includes the relays 51, 52, and 53, and switches the connection state of the stator windings of the electric motor 43 between the star connection and a delta connection. Each of the relays 51, 52, and 53 is a change-over contact relay, and includes a contact plate with one terminal connected to the corresponding stator winding and the other terminal connected to a first contact or a second contact, and a coil for operating the contact plate. The relay 51 includes the contact plate 61, contacts 71 and 81, and a coil 91. The contact plate 61 is connected to the contact 71 that is the first contact when no current flows through the coil 91, and is connected to the contact 81 that is the second contact when a current flows through the coil 91.

Like the relay 51, the relay 52 includes the contact plate 62, contacts 72 and 82, and a coil 92. The contact plate 62 is connected to the contact 72 that is the first contact when no current flows through the coil 92, and is connected to the contact 82 that is the second contact when a current flows through the coil 92. The relay 53 includes the contact plate 63, contacts 73 and 83, and a coil 93. The contact plate 63 is connected to the contact 73 that is the first contact when no current flows through the coil 93, and is connected to the contact 83 that is the second contact when a current flows through the coil 93.

One-end terminals of the three stator windings of the electric motor 43 are connected to three output terminals of the inverter 42, and the other-end terminals are connected to the contact plates 61, 62, and 63 of the three relays 51, 52, and 53. The contacts 71, 72, and 73 are connected to the neutral terminal 44. The contacts 81, 82, and 83 are connected to the three output terminals of the inverter 42.

When no currents flow through the coils 91, 92, and 93, the contact plates 61, 62, and 63 are connected to the contacts 71, 72, and 73, so that the other-end terminals of the three stator windings of the electric motor 43 are connected to the neutral terminal 44, and the connection state becomes the star connection. When currents flow through the coils 91, 92, and 93, the contact plates 61, 62, and 63 are connected to the contacts 81, 82, and 83, so that the other-end terminals of the three stator windings of the electric motor 43 are connected to the terminals of the different stator windings, and the connection state becomes the delta connection.

Figure 3:
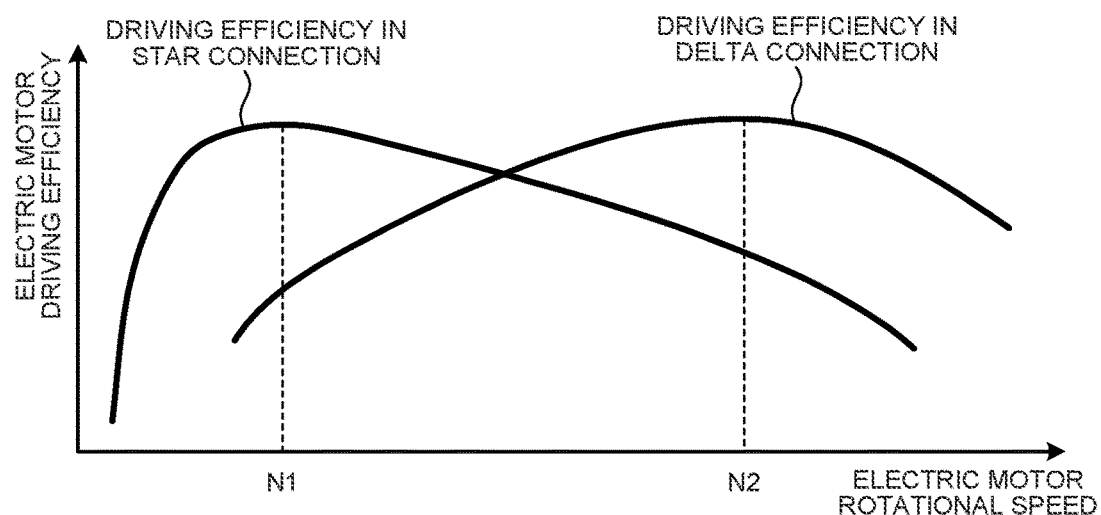
FIG. 3 is a graph illustrating the relationship between the driving efficiency of an electric motor included in the outdoor unit in the air-conditioning apparatus according to the first embodiment and the rotational speed of the electric motor in both a star connection and a delta connection.

FIG. 3 is a graph illustrating the relationship between the driving efficiency of the electric motor 43 included in the outdoor unit 2 in the air-conditioning apparatus 1 according to the first embodiment, and the rotational speed of the electric motor 43 in each of the star connection and the delta connection. The number of turns of the three stator windings of the electric motor 43 is fixed regardless of the connection state. Thus, the rotational speed at which the driving efficiency in the star connection is maximized is different from the rotational speed at which the driving efficiency in the delta connection is maximized. The rotational speed N2 at which the driving efficiency is maximized in the delta connection is larger than the rotational speed N1 at which the driving efficiency is maximized in the star connection. Therefore, the electric motor 43 is driven in the star connection under low load conditions in which the rotational speed of the electric motor 43 driving the compressor 21 is reduced, and the electric motor 43 is driven in the delta connection under high load conditions in which the rotational speed of the electric motor 43 is increased, so that the electric motor 43 can be driven with higher driving efficiency under both low load conditions and high load conditions.

Figure 4:
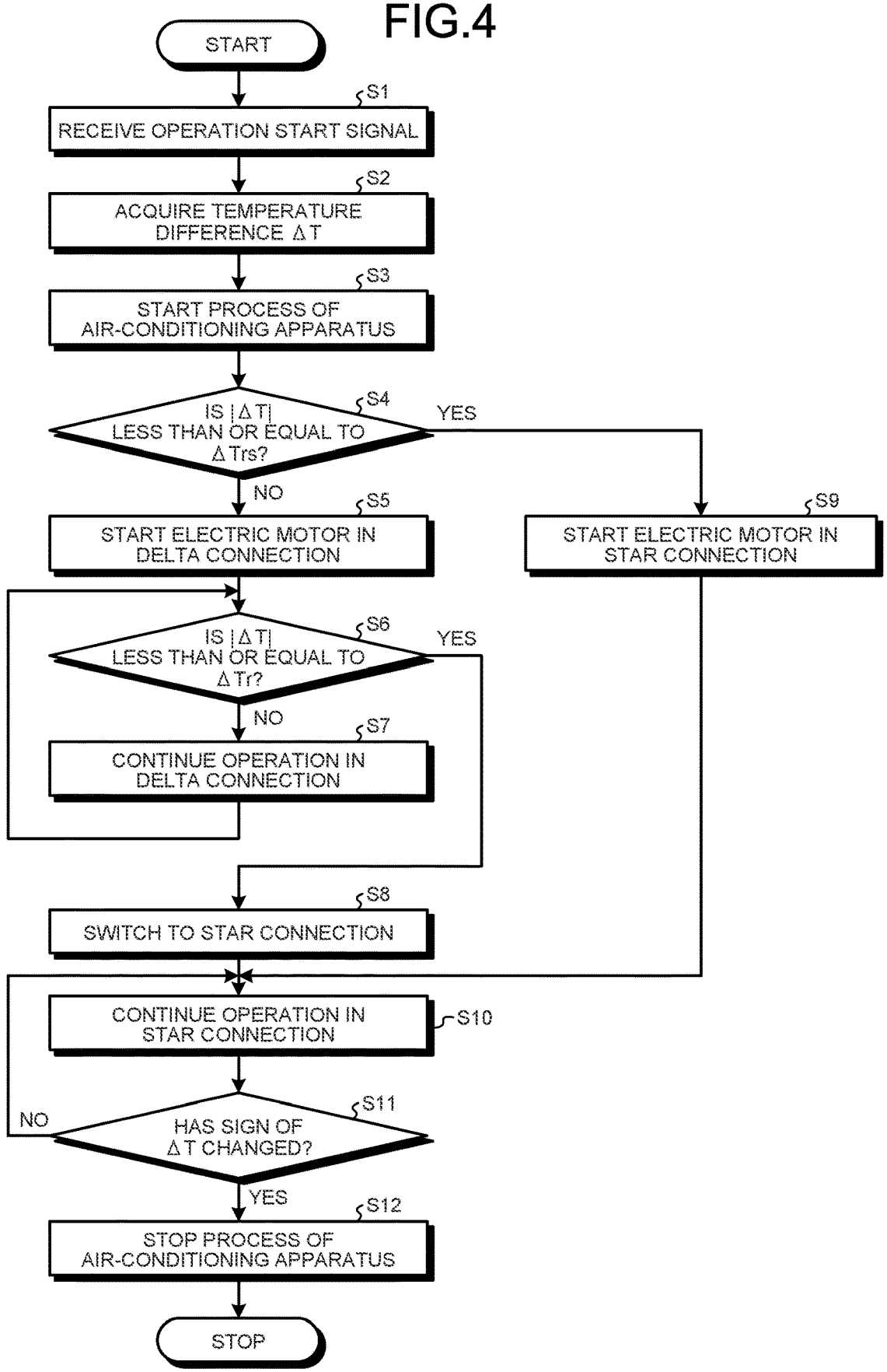
FIG. 4 is a flowchart illustrating the steps of a basic operation executed by the air-conditioning apparatus according to the first embodiment.

Next, the operation of the air-conditioning apparatus 1 according to the first embodiment will be described. FIG. 4 is a flowchart illustrating the steps of a basic operation executed by the air-conditioning apparatus 1 according to the first embodiment. The indoor unit controller 31 starts operation when receiving an operation start signal from the remote controller 4 (S1), and acquires a temperature difference ΔT that is a difference between the set temperature indicated by information received from the remote controller 4 and the indoor temperature detected by the indoor temperature detection unit 32 (S2). The indoor unit controller 31 and the outdoor unit controller 23 perform a start process of the air-conditioning apparatus 1 (S3). Specifically, the indoor unit controller 31 drives a fan motor of the indoor unit fan 34, and the outdoor unit controller 23 drives a fan motor of the outdoor unit fan 28.

The indoor unit controller 31 determines whether or not the absolute value of the temperature difference ΔT is less than or equal to a predetermined threshold ΔTrs (S4). If the indoor unit controller 31 determines that the absolute value of the temperature difference ΔT is larger than the threshold ΔTrs (No in S4), the outdoor unit controller 23 gives the motor control unit 45 a command to start the electric motor 43 in the delta connection, in the motor control unit 45, the contact control unit 47 sets the connection state of the electric motor 43 to the delta connection, and the inverter control unit 48 controls the semiconductor switching elements of the inverter 42 to drive the electric motor 43 (S5).

Next, the indoor unit controller 31 determines whether or not the absolute value of the temperature difference ΔT is less than or equal to a different predetermined threshold ΔTr (S6). If the indoor unit controller 31 determines that the absolute value of the temperature difference ΔT is larger than the different threshold ΔTr (No in S6), the outdoor unit controller 23 continues the operation in the delta connection (S7). After the operation in step S7 is performed, the operation in step S6 is performed. The indoor unit controller 31 may perform the determination in step S6 at regular time intervals or according to interrupts of any external detection information.

If the indoor unit controller 31 determines that the absolute value of the temperature difference ΔT is less than or equal to the different threshold ΔTr after the operation of the electric motor 43 is continued (Yes in S6), the outdoor unit controller 23 gives the motor control unit 45 a command to switch from the delta connection to the star connection, in the motor control unit 45, the contact control unit 47 switches the connection state of the electric motor 43 to the star connection, and the inverter control unit 48 switches from delta connection control to star connection control (S8). The outdoor unit controller 23 continues the operation in the star connection without stopping the electric motor 43 operating the compressor 21 (S10).

If the indoor unit controller 31 determines that the absolute value of the temperature difference ΔT is less than or equal to the threshold ΔTrs (Yes in S4), the outdoor unit controller 23 gives the motor control unit 45 a command to start the electric motor 43 in the star connection, in the motor control unit 45, the contact control unit 47 sets the connection state of the electric motor 43 to the star connection, and the inverter control unit 48 controls the semiconductor switching elements of the inverter 42 to drive the electric motor 43 (S9). After the operation in step S9 is performed, the operation of the air-conditioning apparatus 1 proceeds to step S10.

After the operation in step S10 is performed, the indoor unit controller 31 determines whether or not the sign of the temperature difference ΔT changes (S11). If the indoor unit controller 31 determines that the sign of the temperature difference ΔT has changed, that is, if the temperature difference ΔT becomes zero, and the sign of the temperature difference ΔT is reversed (Yes in S11), the outdoor unit controller 23 stops the electric motor 43 to prevent excessive air conditioning. Consequently, the compressor 21 stops. The stopping of the compressor 21 causes a stop process of the air-conditioning apparatus 1 to be performed (S12). If the indoor unit controller 31 determines that the sign of the temperature difference ΔT remains unchanged (No in S11), the operation in step S10 is performed.

FIG. 5 is a timing chart illustrating how the rotational speed and the connection state of an electric motor in a conventional air-conditioning apparatus and the indoor temperature change with time. FIG. 6 is a timing chart illustrating how the rotational speed and the connection state of the electric motor 43 in the air-conditioning apparatus 1 according to the first embodiment and the indoor temperature change with time when the absolute value of the temperature difference ΔT at the start of operation is less than or equal to the threshold ΔTrs. FIG. 7 is a timing chart illustrating how the rotational speed and the connection state of the electric motor 43 in the air-conditioning apparatus 1 according to the first embodiment and the indoor temperature change with time when the absolute value of the temperature difference ΔT at the start of operation is larger than the threshold ΔTrs.

As illustrated in FIGS. 5(A) and (B), in the conventional air-conditioning apparatus, when a remote controller transmits an operation start signal to start operation, a motor drive system starts in a delta connection. The conventional air-conditioning apparatus continues a high output state even after the indoor temperature reaches a set temperature, so that an overshoot occurs in the indoor temperature, and the total output of the conventional air-conditioning apparatus becomes excessive. After that, the motor drive system stops the electric motor and then switches the connection state to a star connection and starts again, and the conventional air-conditioning apparatus adjusts the indoor temperature to the set temperature.

As illustrated in FIGS. 6(A) and (B), in the air-conditioning apparatus 1 according to the first embodiment, if the absolute value of the temperature difference ΔT at the start of operation is less than or equal to the threshold ΔTrs, the motor drive system 22 starts in the star connection. In the star connection, the rotational speed of the electric motor 43 is less than or equal to a certain threshold, so that the air-conditioning apparatus 1 is in a low output state, and no overshoot occurs in the indoor temperature. Thus, the total output of the air-conditioning apparatus 1 does not become excessive. Further, an operating time at rotational speeds near the rotational speed N1 at which the driving efficiency is maximized in the star connection becomes relatively long, so that the total output power of the motor drive system 22 becomes small, and the air-conditioning apparatus 1 can reduce total power consumption.

As illustrated in FIGS. 7(A) and (B), in the air-conditioning apparatus 1 according to the first embodiment, if the absolute value of the temperature difference ΔT at the start of operation is larger than the threshold ΔTrs, the motor drive system 22 starts in the delta connection. Then, at the point in time when the absolute value of the temperature difference ΔT reaches the threshold ΔTrs, the motor drive system 22 switches the connection state of the electric motor 43 to the star connection without stopping the compressor 21, to set the rotational speed of the electric motor 43 to or below the certain threshold. Since the connection state is switched to reduce the rotational speed of the electric motor 43 before the indoor temperature reaches the set temperature, no overshoot in the indoor temperature occurs, and the total output of the air-conditioning apparatus 1 does not become excessive. Further, the connection state is selected depending on the absolute value of the temperature difference ΔT, and an operating time at rotational speeds near the rotational speeds N2 and N1 at which the driving efficiency is maximized in the corresponding connections becomes relatively long, so that proper operating conditions are achieved during the entire period until the indoor temperature reaches the set temperature. As a result, the total output power of the motor drive system 22 is reduced, and the air-conditioning apparatus 1 can reduce the total power consumption.

As described above, in the first embodiment, if the absolute value of the temperature difference ΔT at the start of operation is less than or equal to the threshold ΔTrs, the air-conditioning apparatus 1 sets the connection state of the electric motor 43 to the star connection for startup. This provides the effect that the total power consumption of the motor drive system 22 can be reduced without causing an excessive total output of the air-conditioning apparatus 1. If the absolute value of the temperature difference ΔT at the start of operation is larger than the threshold ΔTrs, and the absolute value of the temperature difference ΔT becomes less than or equal to the threshold ΔTrs during the operation of the compressor 21, the air-conditioning apparatus 1 switches the connection state of the electric motor 43 from the delta connection to the star connection without stopping the operation of the compressor 21. Thus, the air-conditioning apparatus 1 can select the connection state depending on the absolute value of the temperature difference ΔT, and can operate in proper operating conditions during the entire period until the indoor temperature reaches the set temperature. That is, the air-conditioning apparatus 1 according to the first embodiment can prevent excessive total output while improving driving efficiency.

Second Embodiment

During the operation of the air-conditioning apparatus 1 according to the first embodiment, the absolute value of the temperature difference ΔT may change from a state of being smaller than the threshold ΔTrs to a state of being larger due to a change in the indoor temperature or a change in the set temperature made by the operation of the remote controller 4. The air-conditioning apparatus 1 is required to be in a high output state, but the rotational speed of the electric motor 43 is limited to the certain threshold or less since the connection state of the electric motor 43 is the star connection. Thus, the air-conditioning apparatus 1 is not brought into a high output state. An air-conditioning apparatus according to a second embodiment is an apparatus that switches the connection state of an electric motor without stopping a compressor when a high output state is required. The configuration of the air-conditioning apparatus according to the second embodiment is the same as the configuration of the air-conditioning apparatus 1 according to the first embodiment. However, the operation of the air-conditioning apparatus according to the second embodiment is different from the operation of the air-conditioning apparatus 1 according to the first embodiment. In the second embodiment, differences from the first embodiment will be mainly described.

Figure 8:
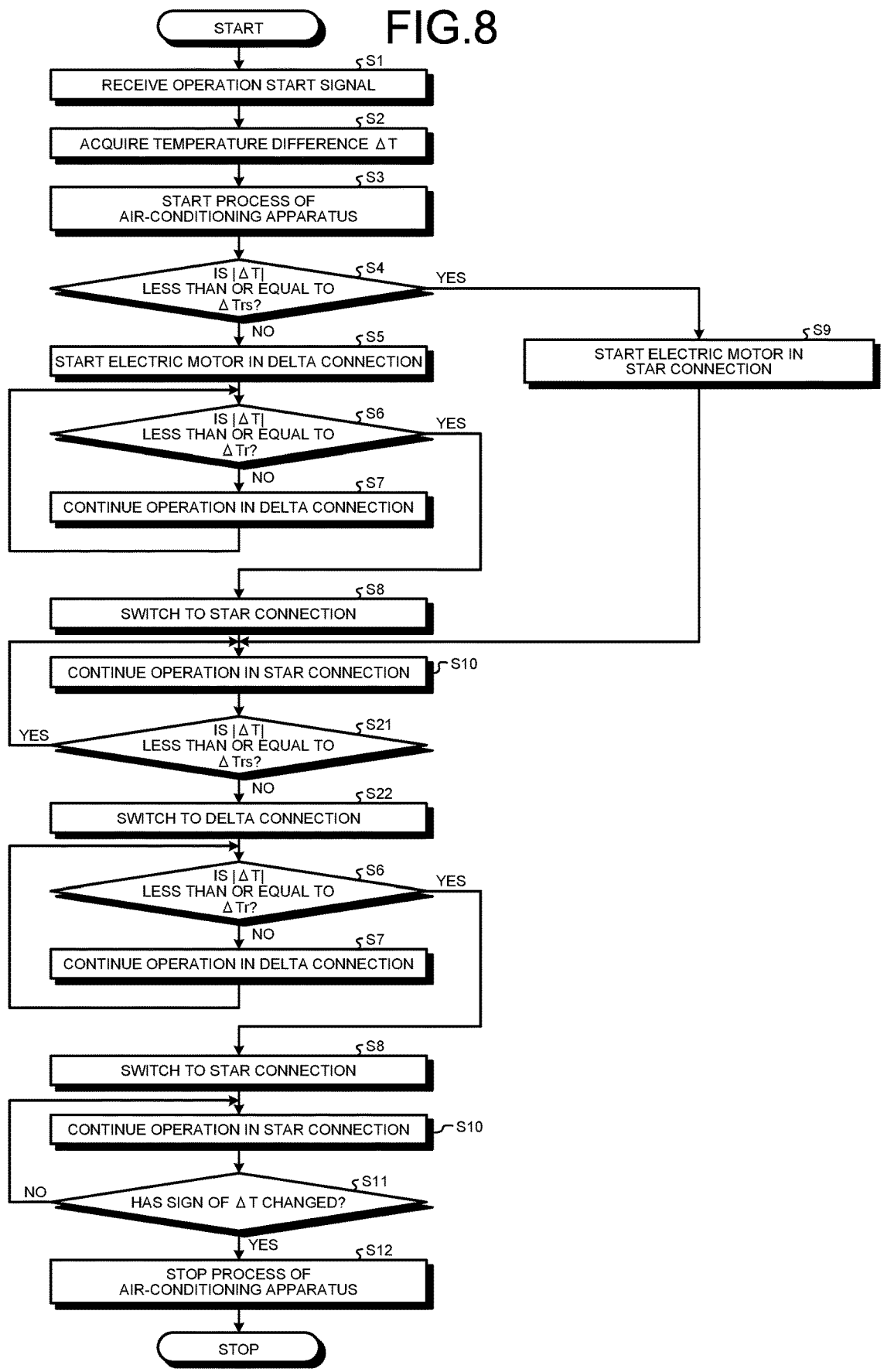
FIG. 8 is a flowchart illustrating the steps of operation in a star connection executed by an air-conditioning apparatus according to a second embodiment.

FIG. 8 is a flowchart illustrating the steps of operation in a star connection executed by the air-conditioning apparatus according to the second embodiment. Of the operation of the air-conditioning apparatus according to the second embodiment, operation from step S1 to step S10 in which operation in the star connection is continued is the same as the operation from step S1 to step S10 performed by the air-conditioning apparatus 1 according to the first embodiment in FIG. 4.

After the operation in step S10 is performed, the indoor unit controller 31 determines whether or not the absolute value of the temperature difference ΔT is less than or equal to the predetermined threshold ΔTrs (S21). If the indoor unit controller 31 determines that the absolute value of the temperature difference ΔT is less than or equal to the threshold ΔTrs (Yes in S21), the operation in step S10 is performed. That is, the operation in the star connection is continued.

If the indoor unit controller 31 determines that the absolute value of the temperature difference ΔT is larger than the threshold ΔTrs (No in S21), the outdoor unit controller 23 gives the motor control unit 45 a command to switch from the star connection to the delta connection, and the contact control unit 47 of the motor control unit 45 switches the connection state of the electric motor 43 from the star connection to the delta connection (S22). The indoor unit controller 31 may perform the determination in step S21 at regular time intervals or according to interrupts of any external detection information.

The operating condition after the connection state of the electric motor 43 is switched to the delta connection is the same as the operating condition after step S5 in FIG. 4 is performed. Thus, after the operation in step S22 is performed, the operation in and after step S6 in FIG. 4 is performed.

The conventional air-conditioning apparatus, in which the motor drive system stops the electric motor and then switches the connection state to the delta connection to start again, requires a relatively long time to bring the indoor temperature to the set temperature. The air-conditioning apparatus according to the second embodiment switches the connection state to the delta connection without stopping the electric motor 43, and thus can relatively shorten the time until the indoor temperature is brought to the set temperature.

Third Embodiment

In the first embodiment and the second embodiment described above, the connection state is selected based on the absolute value of the temperature difference ΔT. An air-conditioning apparatus according to the third embodiment is an apparatus that selects the connection state not based on the absolute value of the temperature difference ΔT. Specifically, the air-conditioning apparatus according to the third embodiment selects the connection state of an electric motor based on a connection state selection pattern independent of the absolute value of the temperature difference ΔT. The connection state selection pattern indicates a pattern of the connection state of three stator windings included in the electric motor. In the third embodiment, differences from the first embodiment will be mainly described.

Figure 9:
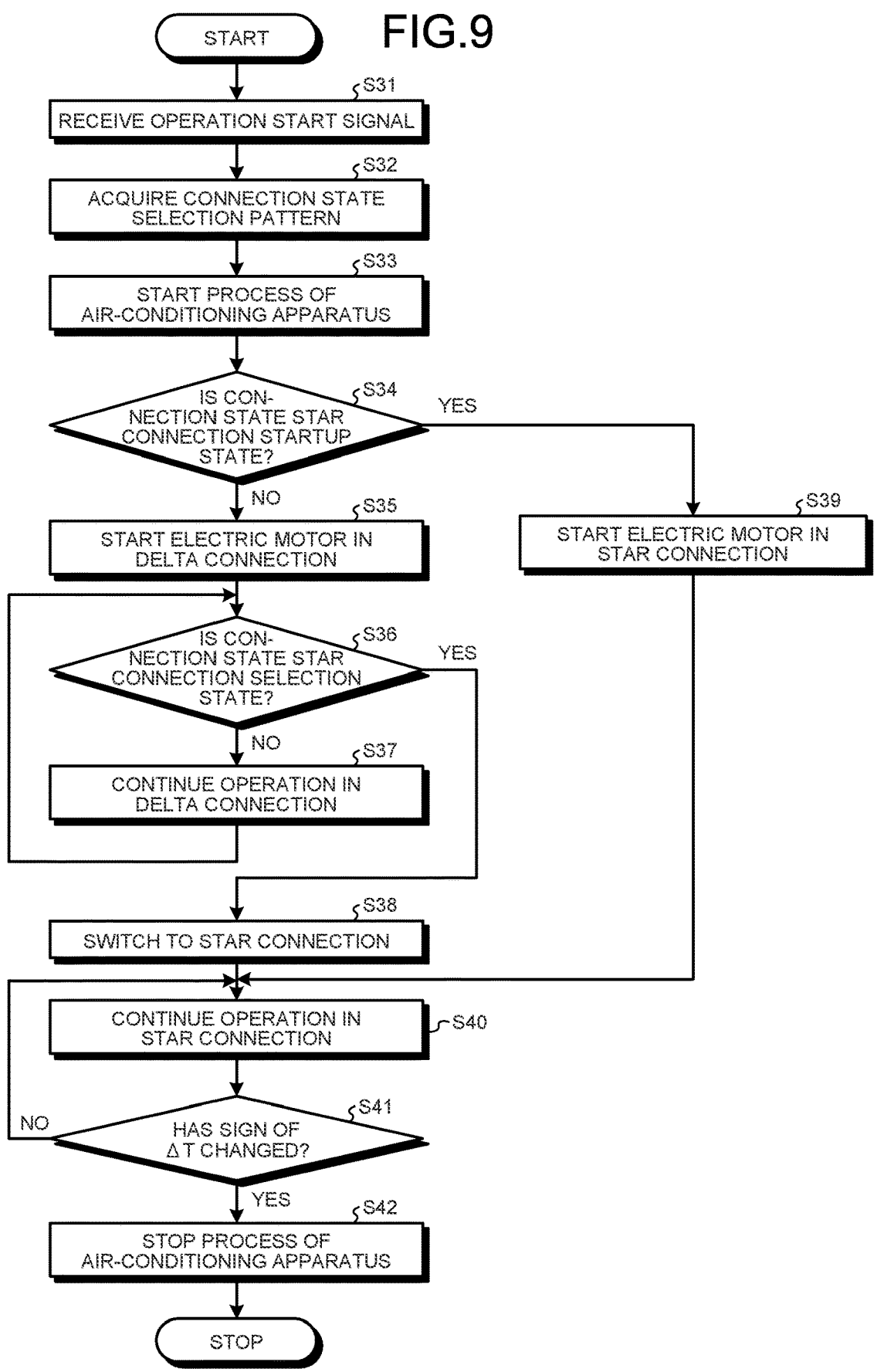
FIG. 9 is a flowchart illustrating the steps of operation executed by an air-conditioning apparatus according to a third embodiment.

FIG. 9 is a flowchart illustrating the steps of operation executed by the air-conditioning apparatus according to the third embodiment. The indoor unit controller 31 receives an operation start signal from the remote controller 4 (S31). The indoor unit controller 31 acquires the connection state selection pattern (S32), and after the air-conditioning apparatus according to the third embodiment performs a start process (S33), determines whether or not the connection state is a star connection startup state, based on the connection state selection pattern (S34). The operation in step S33 is the same as the operation in step S3 in FIG. 4.

If the indoor unit controller 31 determines that the connection state of the electric motor 43 is not the star connection startup state (No in S34), the motor drive system 22 sets the connection state of the electric motor 43 to the delta connection and starts the electric motor 43 (S35). After that, the motor drive system 22 determines whether or not the connection state of the electric motor 43 is a star connection selection state (S36). If the motor drive system 22 determines that the connection state of the electric motor 43 is a delta connection selection state (No in S36), the operation in the delta connection is continued (S37). After the operation in step S37 is performed, the operation in step S36 is performed.

If the motor drive system 22 determines that the connection state of the electric motor 43 is the star connection selection state due to, for example, a change in the indoor temperature (Yes in S36), the connection state of the electric motor 43 is switched from the delta connection to the star connection, and the control of the inverter control unit 48 is switched from delta connection control to star connection control (S38). The air-conditioning apparatus continues the operation in the star connection without stopping the electric motor 43 operating the compressor 21 (S40). The motor drive system 22 may perform the determination in step S36 at regular time intervals or according to interrupts of any external detection information.

If the indoor unit controller 31 determines that the connection state of the electric motor 43 is the star connection startup state (Yes in S34), the electric motor 43 starts in the star connection (S39). The operation in step S39 is the same as the operation in step S9 in FIG. 4. After the operation in step S39 is performed, the operation in step S40 is performed.

After the operation in step S40 is performed, the indoor unit controller 31 determines whether or not the sign of the temperature difference ΔT changes (S41). The operation in step S41 is the same as the operation in step S11 in FIG. 4. If the indoor unit controller 31 determines that the sign of the temperature difference ΔT has changed (Yes in S41), the outdoor unit controller 23 stops the electric motor 43 to prevent excessive air conditioning. Consequently, the compressor 21 stops. The stopping of the compressor 21 causes a stop process of the air-conditioning apparatus to be performed (S42). If the indoor unit controller 31 determines that the sign of the temperature difference ΔT remains unchanged (No in S41), the operation in step S40 is performed.

The connection state selection pattern is determined based in part or in whole on information related to the installation space of the indoor unit 3, the temperature and the humidity of the installation space, information related to the distribution of the temperature and the humidity of the installation space, the operating condition of the air-conditioning apparatus, information related to temporal changes in the temperature and the humidity, and information related to temporal changes in the distribution of the temperature and the humidity. The installation space is a space of the room in which the indoor unit 3 is installed. The connection state selection pattern may be determined by the indoor unit controller 31 based on second information stored in a cloud server which is the above information on an air-conditioning apparatus other than the air-conditioning apparatus according to the third embodiment. That is, the connection state selection pattern may be determined also using the second information. The indoor unit controller 31 acquires the second information through an information communication line.

Figure 10:
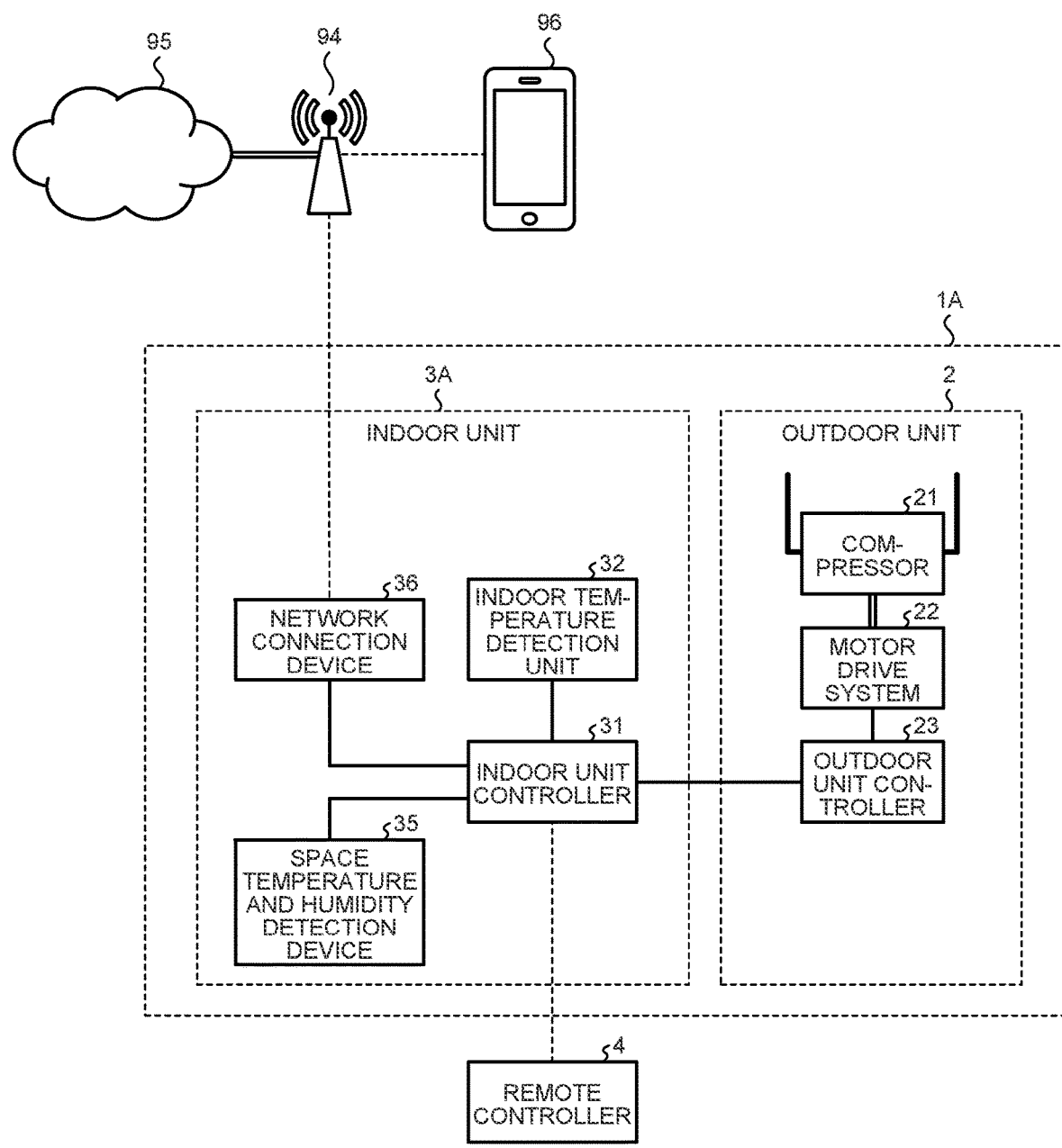
FIG. 10 is a diagram illustrating the configuration of the air-conditioning apparatus according to the third embodiment.

FIG. 10 is a diagram illustrating the configuration of an air-conditioning apparatus 1A according to the third embodiment. The air-conditioning apparatus 1A includes a space temperature and humidity detection device 35 and a network connection device 36 in addition to a plurality of components included in the air-conditioning apparatus 1 according to the first embodiment. The space temperature and humidity detection device 35 and the network connection device 36 are included in an indoor unit 3A included in the air-conditioning apparatus 1A.

The network connection device 36 is connected to an access point 94. The access point 94 is connected to a cloud server 95 via an information communication line. An information communication terminal 96 connectable to the access point 94 allows the information related to the installation space of the indoor unit 3A to be set in the indoor unit controller 31, the information related to the temperature and the humidity of the installation space to be read, the information related to the distribution of the temperature and the humidity of the installation space to be read, and the information stored in the cloud server 95 to be acquired by the indoor unit controller 31. FIG. 10 omits the description of a refrigeration cycle that is not directly related to operation characteristic of the air-conditioning apparatus 1A according to the third embodiment.

The information related to the installation space of the indoor unit 3A is obtained by setting the area or volume of the installation space with the remote controller 4 or the information communication terminal 96. The temperature and the humidity of the installation space and the information related to the distribution of the temperature and the humidity are acquired by the space temperature and humidity detection device 35. Large numbers of those stored together with time information are obtained as temporal change information on them. A large number of operating conditions of the air-conditioning apparatus 1A stored together with time information are also obtained as temporal change information on the operating conditions. The temporal change information indicates temporal changes in the information related to the installation space of the indoor unit 3A. The connection state selection pattern may be determined based on the temporal change information.

The connection state selection pattern is generated by, for example, changing the threshold ΔTrs based on the above information. The smaller the area of the installation space of the indoor unit 3A, the larger the change of the indoor temperature per unit time. Thus, increasing the threshold ΔTrs can prevent the occurrence of an overshoot in the indoor temperature.

The change of the indoor temperature per unit time is affected by the heat insulation performance of the installation space depending on the amount of heat exchange with an adjacent space per unit time. The indoor temperature is the temperature of the room in which the indoor unit 3A is installed. Thus, the threshold ΔTrs is changed in accordance with the operating condition of the air-conditioning apparatus 1A, the information related to temporal changes in the temperature and the humidity, and the information related to temporal changes in the distribution of the temperature and the humidity. The effects obtained are that if the number of overshoots that occur in the temperature of the installation space is larger than a predetermined number, the threshold ΔTrs can be set to a relatively large value to prevent the occurrence of overshoots, and if the time until the indoor temperature reaches the set temperature without the occurrence of overshoots is longer than a predetermined time, the threshold ΔTrs can be set to a relatively small value to make the time until the indoor temperature reaches the set temperature shorter than the predetermined time.

In addition, when the indoor unit controller 31 acquires the information stored in the cloud server 95, the air-conditioning apparatus 1A can change the threshold ΔTrs without the information related to temporal changes. This allows the air-conditioning apparatus 1A to change the threshold ΔTrs immediately after being installed.

Fourth Embodiment

Figure 11:
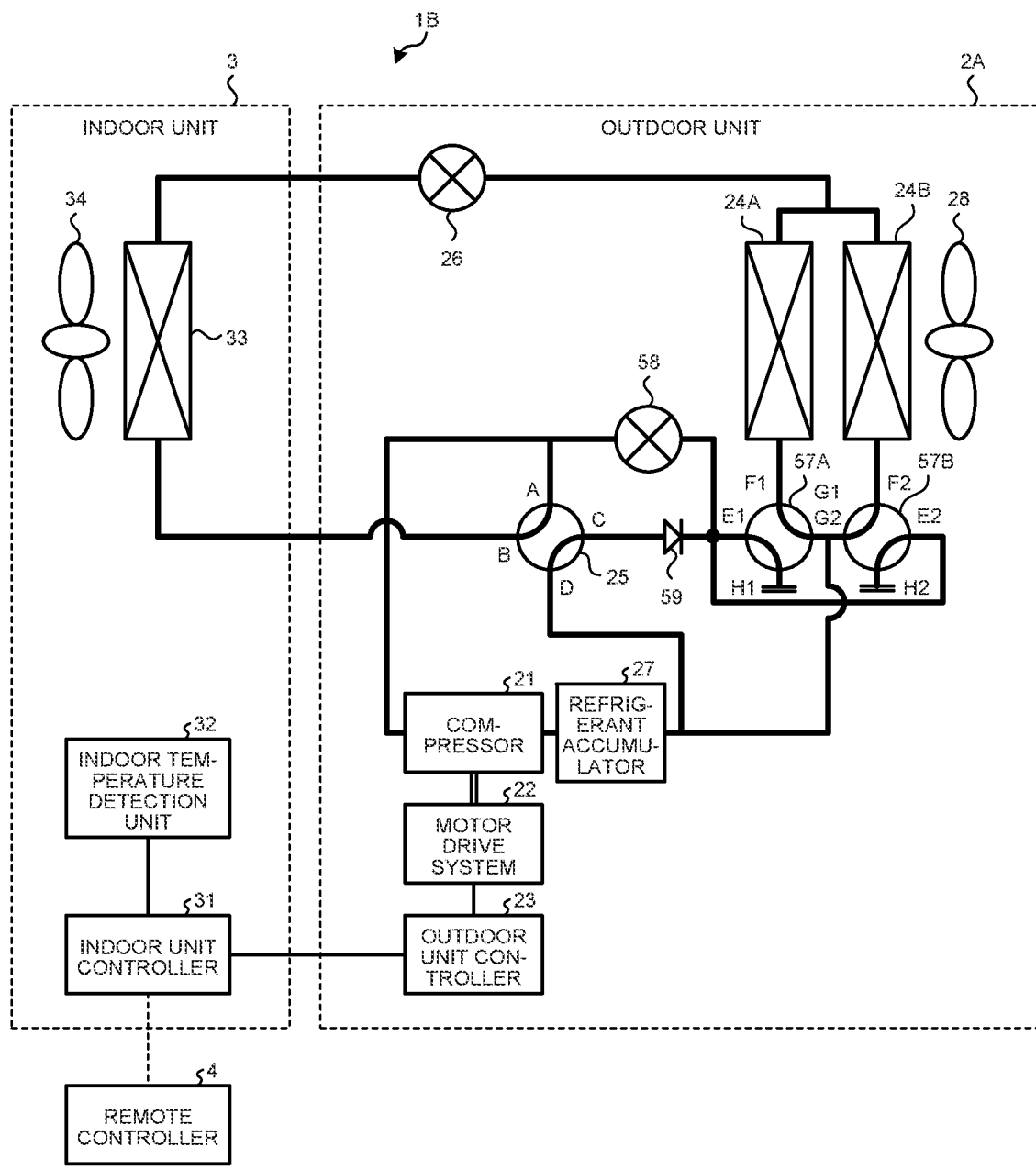
FIG. 11 is a diagram illustrating the configuration of an air-conditioning apparatus according to a fourth embodiment.

FIG. 11 is a diagram illustrating the configuration of an air-conditioning apparatus 1B according to a fourth embodiment. The air-conditioning apparatus 1B includes an outdoor unit 2A. In the fourth embodiment, the refrigeration cycle of the outdoor unit 2A is different from the refrigeration cycle of the outdoor unit 2 in the first embodiment. The following describes differences of the configuration and operation of the air-conditioning apparatus 1B from the configuration and operation of the air-conditioning apparatus 1 according to the first embodiment.

The air-conditioning apparatus 1B includes the indoor unit 3 in the first embodiment and the outdoor unit 2A. The outdoor unit 2A includes the compressor 21, the motor drive system 22, the outdoor unit controller 23, the four-way valve 25, the pressure-reducing unit 26, the refrigerant accumulator 27, and the outdoor unit fan 28. The outdoor unit 2A further includes an outdoor unit heat exchanger 24A and an outdoor unit heat exchanger 24B. The outdoor unit heat exchanger 24A and the outdoor unit heat exchanger 24B are an example of two or more outdoor unit heat exchangers. The outdoor unit 2A further includes a four-way valve 57A, a four-way valve 57B, an electromagnetic valve 58, and a check valve 59. In the fourth embodiment, the connection state switching unit 46 has a function to change the connection state of the three stator windings included in the electric motor 43, and switches the connection state between a star connection and a delta connection without stopping the operation of the compressor 21 when the air-conditioning apparatus 1B is operating.

When cooling operation is set with the remote controller 4, the four-way valve 25 connects a connection point A and a connection point C and connects a connection point B and a connection point D, the four-way valve 57A connects a connection point E1 and a connection point F1 and connects a connection point G1 and a connection point H1, and the four-way valve 57B connects a connection point E2 and a connection point F2 and connects a connection point G2 and a connection point H2. This produces condensation in the outdoor unit heat exchanger 24A and the outdoor unit heat exchanger 24B of the outdoor unit 2A, and produces evaporation in the indoor unit heat exchanger 33 of the indoor unit 3, and the air-conditioning apparatus 1B performs the cooling operation. That is, the air-conditioning apparatus 1B has a function to allow the indoor unit heat exchanger 33 and one or some outdoor unit heat exchangers of the two or more outdoor unit heat exchangers to condense the refrigerant at the same time.

When heating operation is set with the remote controller 4, the four-way valve 25 connects the connection point A and the connection point B and connects the connection point C and the connection point D, the four-way valve 57A connects the connection point E1 and the connection point H1 and connects the connection point F1 and the connection point G1, and the four-way valve 57B connects the connection point E2 and the connection point H2 and connects the connection point F2 and the connection point G2. This produces condensation in the indoor unit heat exchanger 33 of the indoor unit 3, and produces evaporation in the outdoor unit heat exchanger 24A and the outdoor unit heat exchanger 24B of the outdoor unit 2A, and the air-conditioning apparatus 1B performs the heating operation.

If frost formation on the outdoor unit heat exchanger 24A is detected during the heating operation, for example, if a temperature detected by a temperature detection unit (not illustrated) connected to the outdoor unit heat exchanger 24A becomes less than or equal to a predetermined threshold, the four-way valve 57A connects the connection point E1 and the connection point F1 and connects the connection point G1 and the connection point H1. Then, the electromagnetic valve 58 opens. As a result, the compressed refrigerant with a relatively high temperature is sent to the outdoor unit heat exchanger 24A, melting the frost. Hereinafter, operation for melting frost is described as "defrost operation".

If frost formation on the outdoor unit heat exchanger 24B is detected during the heating operation, the four-way valve 57B connects the connection point E2 and the connection point F2 and connects the connection point G2 and the connection point H2. Operation other than that of the four-way valve 57B is the same as the operation performed when frost formation on the outdoor unit heat exchanger 24A is detected.

In the operation when frost formation on the outdoor unit heat exchanger 24A is detected, condensation occurs in both the indoor unit heat exchanger 33 of the indoor unit 3 and the outdoor unit heat exchanger 24A of the outdoor unit 2A. Thus, to maintain the amount of heat exchange in the indoor unit 3 at a predetermined value or more, it is necessary to increase the rotational speed of the motor included in the compressor 21 to increase the amount of the refrigerant compressed by the compressor 21 for a high output state. If the connection state of the electric motor 43 is the star connection, the rotational speed of the electric motor 43 is limited to the certain threshold or less, and the air-conditioning apparatus 1B is not brought into a high output state. Therefore, the connection state switching unit 46 sets the connection state of the electric motor 43 to the delta connection to increase the rotational speed of the motor included in the compressor 21.

Figure 12:
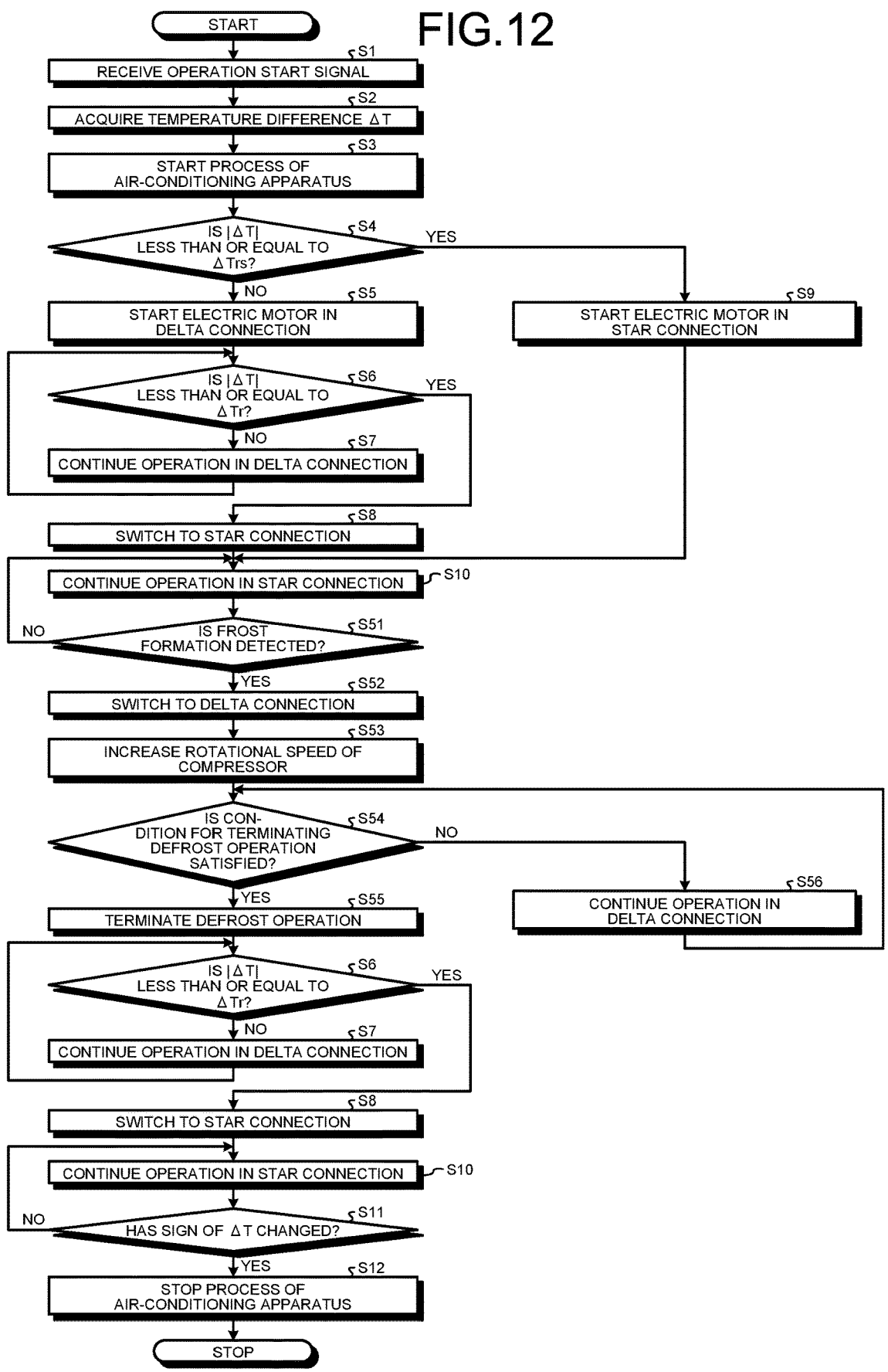
FIG. 12 is a flowchart illustrating the steps of operation when frost formation is detected, which is executed by the air-conditioning apparatus according to the fourth embodiment.

Next, the operation of the air-conditioning apparatus 1B according to the fourth embodiment will be described. FIG. 12 is a flowchart illustrating the steps of operation performed by the air-conditioning apparatus 1B according to the fourth embodiment when frost formation is detected. Of the operation of the air-conditioning apparatus 1B, operation from step S1 to step S10 in which operation in the star connection is continued is the same as the operation from step S1 to step S10 performed by the air-conditioning apparatus 1 according to the first embodiment in FIG. 4.

If frost formation on the outdoor unit heat exchanger 24A or the outdoor unit heat exchanger 24B is detected after the operation in step S10 is performed (Yes in S51), the outdoor unit controller 23 gives the motor control unit 45 a command to switch from the star connection to the delta connection. The contact control unit 47 of the motor control unit 45 switches the connection state of the electric motor 43 to the delta connection (S52). The outdoor unit controller 23 switches the four-way valve 57A or the four-way valve 57B and opens the electromagnetic valve 58, and increases the rotational speed of the motor included in the compressor 21 (S53). When frost formation on the outdoor unit heat exchanger 24A is detected, condensation is produced in the indoor unit heat exchanger 33 of the indoor unit 3 and the outdoor unit heat exchanger 24A of the outdoor unit 2A. As a result, the defrost operation is performed. If frost formation on the outdoor unit heat exchanger 24A and the outdoor unit heat exchanger 24B is not detected (No in S51), the operation of the air-conditioning apparatus 1B proceeds to step S10.

If a condition for terminating the defrost operation is satisfied after the operation in step S53 is performed (Yes in S54), the outdoor unit controller 23 switches the four-way valve 57A or the four-way valve 57B and closes the electromagnetic valve 58 to terminate the defrost operation (S55). The operating condition after step S55 is performed is the same as the operating condition after the operation in step S5 in FIG. 4 is performed. Thus, after step S55 is performed, the air-conditioning apparatus 1B performs the operation in and after step S6 in FIG. 4. If the condition for terminating the defrost operation is not satisfied (No in S54), the outdoor unit controller 23 continues the operation in the delta connection (S56). After the operation in step S56 is performed, the operation in step S54 is performed.

As described above, the air-conditioning apparatus 1B according to the fourth embodiment can switch the connection state without stopping the heating operation in mutual switching between the heating operation and the defrost operation, providing the effect of preventing the occurrence of a decrease in the indoor temperature.

Figure 13:
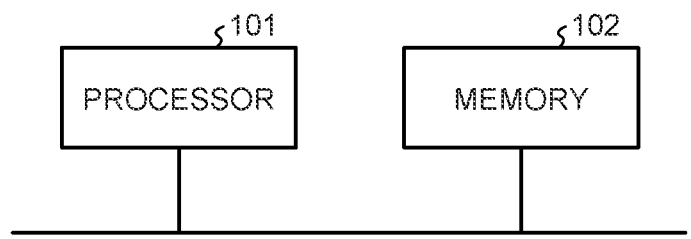
FIG. 13 is a diagram illustrating a processor when some functions of the motor drive system and an outdoor unit controller included in the outdoor unit in the air-conditioning apparatus according to the first embodiment are implemented by the processor.

FIG. 13 is a diagram illustrating a processor 101 when some functions of the motor drive system 22 and the outdoor unit controller 23 included in the outdoor unit 2 in the air-conditioning apparatus 1 according to the first embodiment are implemented by the processor 101. That is, some functions of the motor drive system 22 and the outdoor unit controller 23 may be implemented by the processor 101 that executes a program stored in memory 102. The processor 101 is a central processing unit (CPU), a processing unit, an arithmetic unit, a microprocessor, or a digital signal processor (DSP). FIG. 13 also illustrates the memory 102.

When some functions of the motor drive system 22 and the outdoor unit controller 23 are implemented by the processor 101, those functions are implemented by the processor 101 and software, firmware, or a combination of software and firmware. Software or firmware is described as a program and stored in the memory 102. The processor 101 reads and executes the program stored in the memory 102 to implement some functions of the motor drive system 22 and the outdoor unit controller 23.

When some functions of the motor drive system 22 and the outdoor unit controller 23 are implemented by the processor 101, the outdoor unit 2 includes the memory 102 for storing the program that results in execution of some steps executed by the motor drive system 22 and the outdoor unit controller 23. It can be said that the program stored in the memory 102 causes a computer to execute part of a procedure or method executed by the motor drive system 22 and the outdoor unit controller 23.

The memory 102 is, for example, nonvolatile or volatile semiconductor memory such as random-access memory (RAM), read-only memory (ROM), flash memory, an erasable programmable read-only memory (EPROM), or an electrically erasable programmable read-only memory (EEPROM) (registered trademark), or a magnetic disk, a flexible disk, an optical disk, a compact disk, a mini disk, a digital versatile disk (DVD), or the like.

Figure 14:
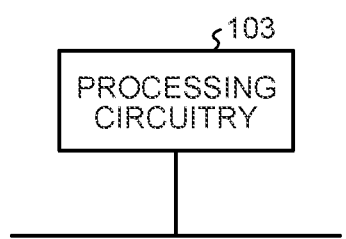
FIG. 14 is a diagram illustrating a processing circuitry when part of the motor drive system and the outdoor unit controller included in the outdoor unit in the air-conditioning apparatus according to the first embodiment is implemented by the processing circuitry.

FIG. 14 is a diagram illustrating a processing circuitry 103 when part of the motor drive system 22 and the outdoor unit controller 23 included in the outdoor unit 2 in the air-conditioning apparatus 1 according to the first embodiment is implemented by the processing circuitry 103. That is, part of the motor drive system 22 and the outdoor unit controller 23 may be implemented by the processing circuitry 103.

The processing circuitry 103 is dedicated hardware. The processing circuitry 103 is, for example, a single circuit, a combined circuit, a programmed processor, a parallel-programmed processor, an application-specific integrated circuit (ASIC), a field-programmable gate array (FPGA), or a combination of them.

Part of the motor drive system 22 and the outdoor unit controller 23 may be dedicated hardware separate from the rest.

For a plurality of functions of the motor drive system 22 and the outdoor unit controller 23, some of the plurality of functions may be implemented by software or firmware, and the rest of the plurality of functions may be implemented by dedicated hardware. Thus, the plurality of functions of the motor drive system 22 and the outdoor unit controller 23 may be implemented by hardware, software, firmware, or a combination of them.

Some or all of the functions of the indoor unit controller 31 included in the indoor unit 3 in the air-conditioning apparatus 1 according to the first embodiment may be implemented by a processor that executes a program stored in memory. The memory has a function equivalent to that of the memory 102. Some or all of the indoor unit controller 31 may be implemented by a processing circuitry. The processing circuitry has a function equivalent to that of the processing circuitry 103.

The configurations described in the above embodiments show an example of the content of the present invention, and can be combined with another known art, and can be partly omitted or changed without departing from the gist of the present invention.

The invention claimed is:

1. An air-conditioning apparatus comprising:
an indoor unit; and
an outdoor unit including a compressor to compress a refrigerant and a motor drive system to drive the compressor,
the motor drive system including
an inverter to convert a DC voltage into an AC voltage,
an electric motor including three stator windings with both ends open, to operate based on the AC voltage obtained by the inverter, and
a connection state switching circuitry having a function to change a connection state of the three stator windings included in the electric motor, to set the connection state to a star connection at a start of operation of the electric motor in any of a cooling mode, a heating mode, and a defrost mode, and
to select the connection state at a startup of the electric motor, based in part or in whole on:
information related to an installation space of the indoor unit, a temperature and a humidity of the installation space, and a temperature difference between the temperature of the installation space and a set temperature,
information related to distribution of the temperature and the humidity of the installation space and an operating condition of the air-conditioning apparatus,
information related to temporal changes in the temperature and the humidity, and
information related to temporal changes in the distribution of the temperature and the humidity,
wherein, when the air-conditioning apparatus is operating, the connection state switching circuitry switches the connection state between the star connection and a delta connection without stopping operation of the compressor, based on the information related to the temperature difference between the temperature of the installation space and the set temperature.

2. The air-conditioning apparatus according to claim 1, wherein the connection state is determined based on second information acquired through an information communication line, the second information being related to a room in which an indoor unit of another air-conditioning apparatus is installed.

3. An air-conditioning apparatus comprising:
an indoor unit including an indoor unit heat exchanger; and
an outdoor unit including two or more outdoor unit heat exchangers, a compressor to compress a refrigerant, and a motor drive system to drive the compressor, the air-conditioning apparatus having a function to allow the indoor unit heat exchanger and one or some outdoor unit heat exchangers of the two or more outdoor unit heat exchangers to condense the refrigerant at the same time,
wherein the motor drive system includes
an inverter to convert a DC voltage into an AC voltage,
an electric motor including three stator windings with both ends open, to operate based on the AC voltage obtained by the inverter, and
a connection state switching circuitry having a function to change a connection state of the three stator windings included in the electric motor, to switch the connection state between a star connection and a delta connection without stopping operation of the compressor when the air-conditioning apparatus is operating.

4. The air-conditioning apparatus according to claim 3, wherein the connection state switching circuitry sets the connection state to the delta connection to increase a rotational speed of a motor included in the compressor.

* * * * *